April 26, 1960 B. L. HAVENS ET AL 2,934,269

PRODUCT GENERATOR

Filed Nov. 23, 1954 5 Sheets-Sheet 1

INVENTORS
BYRON L. HAVENS
CHARLES R. BORDERS
BY Wesley De Bruin
ATTORNEY

PRODUCT GENERATOR

Filed Nov. 23, 1954 5 Sheets-Sheet 2

INVENTORS
BYRON L. HAVENS
CHARLES R. BORDERS
BY
Wesley De Bruin
ATTORNEY

April 26, 1960 B. L. HAVENS ET AL 2,934,269

PRODUCT GENERATOR

Filed Nov. 23, 1954 5 Sheets-Sheet 3

INVENTORS
BYRON L. HAVENS
CHARLES R. BORDERS
BY Wesley D. O'Brien
ATTORNEY

INVENTORS
BYRON L. HAVENS
CHARLES R. BORDERS
BY Wesley De Bruin
ATTORNEY

*INVENTORS*
BYRON L. HAVENS
CHARLES R. BORDERS
BY Wesley De Bruin
ATTORNEY

United States Patent Office 2,934,269

Patented Apr. 26, 1960

2,934,269

PRODUCT GENERATOR

Byron L. Havens, Closter, and Charles R. Borders, Alpine, N.J., assignors to International Business Machines Corporation, New York, N.Y., a corporation of New York Application November 23, 1954, Serial No. 470,715

8 Claims. (Cl. 235—159)

Figure 1:
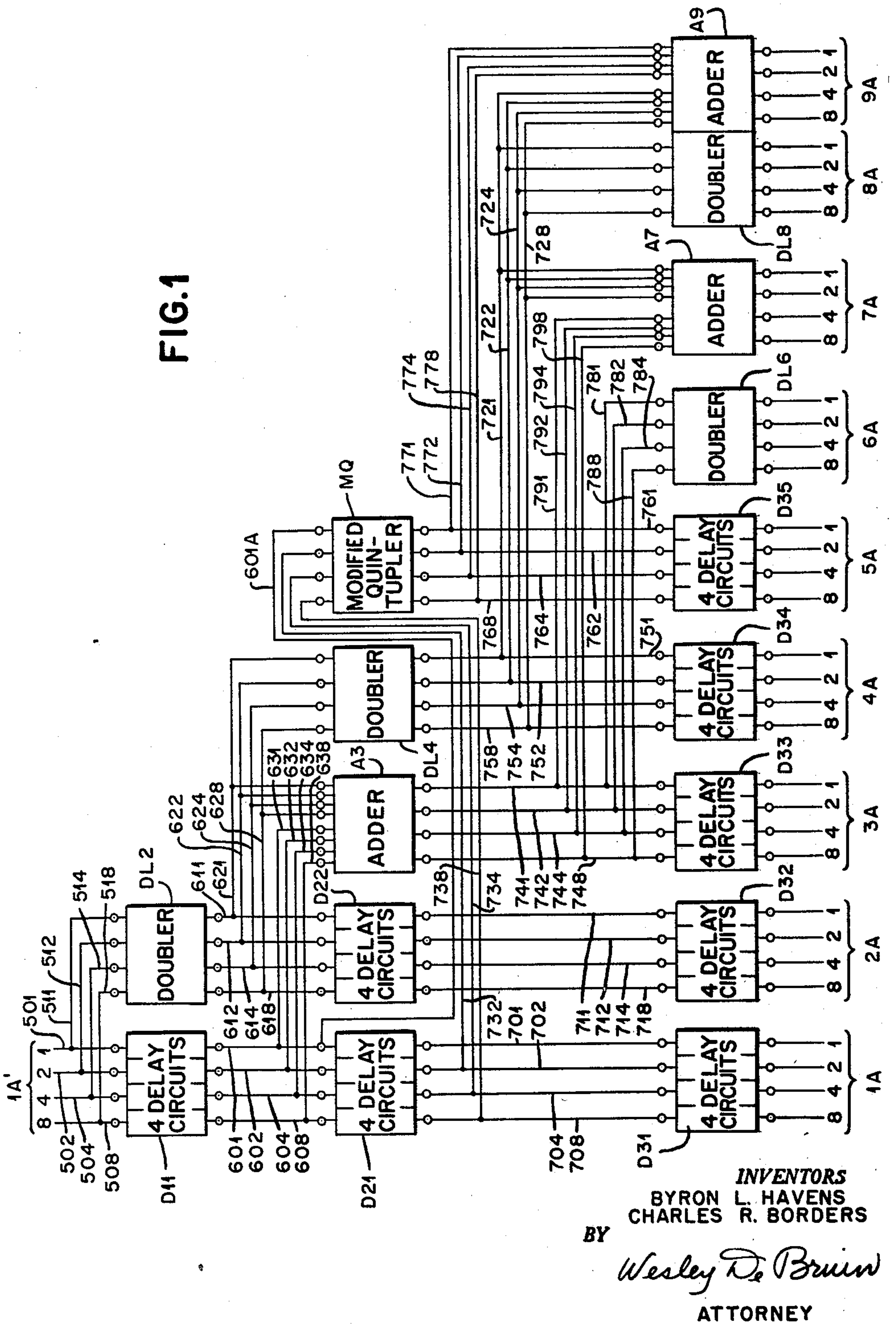

This invention relates to a product generator that renders simultaneous outputs equal to the one through nine multiples of any decimal value represented in binary-decimal notation, parallel by bit, serial by decimal digit and applied to the input thereof. The novel product generator employs a novel doubler circuit and a novel quintupler circuit.

In the binary notation only two kinds of digits are employed, i.e., 0's and 1's. These binary digits are referred to as bits. The digital position or orders in a binary number, reading from right to left, correspond in value to $2^0$, $2^1$, $2^2$, $2^3$, $2^4$, etc. or values 1, 2, 4, 8, 16 etc., respectively. For example, binary number 1001 represents decimal digit 9 which is determined by the addition of decimal digits 1 and 8 indicated by a binary 1 in the extreme right and left binary positions respectively. Hence, by using binary bits or pulses in groups of four wherein a pulse represents a binary 1 and the absence of a pulse represents a binary 0 any decimal digit from 0–9 inclusive may be written in the pure binary notation.

The system of representing decimal numbers, digit for digit, in the pure binary notation is referred to herein as the binary-decimal system, i.e., binary-decimal notation. The four consecutive binary orders, reading from right to left, represent the decimal digits 1, 2, 4 and 8 for the units decimal order and are accordingly referred to as the 1 bit, 2 bit, 4 bit and 8 bit respectively. It follows that the four binary orders of the tens decimal order represents the decimal digits 10, 20, 40 and 80 respectively, and may accordingly be referred to as the 1 bit, 2 bit, 4 bit and 8 bit respectively, of the tens decimal order. Likewise, in subsequent decimal orders, for example, the four respective binary orders of the hundreds decimal order represent the decimal digits 100, 200, 400 and 800 respectively, and may accordingly be referred to as the 1 bit, 2 bit, 4 bit, and 8 bit respectively of the hundreds decimal order.

As an example, 459 will be represented in the binary-decimal system by 0100, 0101, 1001. The four binary bits at the right represent the decimal digit 9 of the units order, the next four bits to the left represent the decimal digit 5 of the tens order, and the four bits at the extreme left represent the decimal digit 4 of the hundreds order.

Any decimal number from 0–15 inclusive can be represented by a group of four binary bits. However, in the binary-decimal system, only the decimal digits (0–9 inclusive) are represented by each group of four binary bits.

In the novel product generator which includes a novel doubler and a novel quintupler circuit the binary-decimal system of notation is employed. The input and output of the special product generator, the doubler circuit and the quintupler circuit are respectively parallel by bit and serial by decimal digit, i.e., the binary bits representing the units order appear first, the binary bits representing the tens order appear a time interval later, the binary bits representing the hundreds order occur one time interval after the tens order, etc.

As to doubling a decimal value expressed in binary-decimal notation, occuring parallel by bit, serial by digit order, a Serial-Parallel Binary-Decimal Adder of the type disclosed and claimed in the U.S. patent application, Serial No. 338,122 of Byron L. Havens et al. filed on February 20, 1953 may be employed. Briefly, the binary-decimal adder of the Havens et al. patent application, referred to above, has a first and a second group of input terminals for accepting a decimal value in binary-decimal notation and a group of output terminals at which the sum of the two quantities will appear in binary-decimal notation. It will be apparent that if a quantity is impressed simultaneously on both groups of input terminals of the Havens et al. adder the group of output terminals will deliver a sum that is the two multiple of the input quantity. Thus, it is seen that the Serial-Parallel Binary-Decimal Adder of the Havens et al. patent application can be utilized as a double circuit. However, the doubler circuit employed in the novel product generator disclosed in detail hereinafter has numerous advantages including the following: simpler, employs a lesser number of components, and renders an improved waveform.

Now considering strict binary notation as distinguished from binary-decimal notation, it will be appreciated that a number expressed in binary notation is doubled by column shifting the binary information one column to the left. For example, consider the decimal digit 7 which in binary notation is written as 0111. Now, if the binary number 0111 is column shifted to the left so as to become the binary number 1110, it has the equivalent decimal value of 14, i.e., there is a binary 1 present in columns of the following binary value: $2^1$, $2^2$ and $2^3$. In like manner, considering the decimal digit 9 which written in binary notation would be 1001, column shifting this binary number to the left results in the binary number 10010 which has an equivalent decimal value of 18, i.e., there is a binary 1 present in columns of the following binary values: $2^1$ and $2^4$.

The primary object of the present invention is to provide a product generator capable of accepting a first decimal value expressed in binary-decimal notation, parallel by bit, serial by digit order, and rendering the one through nine multiples of said first decimal value simultaneously and expressed in binary-decimal notation, parallel by bit, serial by digit order.

A second object of the present invention is to provide a novel doubler circuit capable of accepting a decimal quantity expressed in binary-decimal notation, parallel by bit, serial by digit order and rendering double said decimal quantity expressed in binary-decimal notation, parallel by bit and serial by digit order.

A third object of the present invention is to provide a novel quintupler circuit capable of accepting a decimal quantity expressed in binary-decimal notation, parallel by bit, serial by digit order, and rendering the five multiple of said quantity expressed in binary-decimal notation, parallel by bit and serial by digit order.

A further object of the invention is a novel product generator that operates at a high speed, is highly reliable and is simple and inexpensive to construct.

A still further object of the inventio nis a novel doubler circuit that operates at a high speed, is highly reliable and is simple and inexpensive to construct.

Astill further object of the invention is a novel doubler tupler circuit that operates at a high speed, is highly reliable and is simple and inexpensive to construct.

A yet further object of the present invention is a novel product generator that employs only binary-decimal adder means, delay circuit means, the novel binary-decimal doubler circuit means and the novel binary-decimal quintupler circuit means.

Other objects of the invention will be pointed out in the following description and claims and illustrated in the accompanying drawings, which disclose, by way of example the principle of the invention and the best mode, which has been contemplated, of applying that principle.

The definition of Up (i.e., Up condition) and Down (i.e., Down condition): Various circuits used herein or particular points or terminals within the circuits are frequently referred to as Up or Down. Up means that the voltage present at the particular point, terminal, or at the output of the circuit designated is positive with respect to ground. Down means that the voltage present at the particular point, terminal, or at the output of the circuit designated is negative with respect to ground.

*The doubler circuit.*—The novel doubler circuit disclosed in detail hereinafter accomplishes the shifting of a decimal value expressed in binary-decimal notation one binary column to the left and applying this quantity to a rationalizer circuit to convert the doubled quantity to a 2, 4, 8 and 10 bit notation. The doubled quantity rendered by the rationalizer circuit is impressed on the input terminals of a plurality of delay circuits. The output of the delay circuits is the doubled quantity in pure binary-decimal notation, parallel by bit, serial by digit order. Thus, the novel doubler circuit accepts a decimal quantity in pure binary-decimal notation, parallel by bit, serial by digit order and renders an output of double said decimal quantity in pure binary-decimal notation, parallel by bit, serial by digit order.

*The quintupler circuit.*—Briefly, in a parallel by bit, serial by digit order system it will be appreciated that if the binary-decimal input is delayed one time interval, i.e., from one decimal order to the next higher decimal order, the quantity will effectively be multiplied by 10. For example, assume a binary-decimal input of 0110 in the units order, is delayed one time interval, it will appear as 0110 in the tens order, i.e. the decimal value 60 expressed in binary-decimal notation. Thus it will be appreciated that in a parallel by bit, serial by digit order system, a number expressed in binary-decimal notation can be multiplied by 10 by merely delaying the input the time interval between the decimal orders. This feature is employed in the novel quintupler circuit. Actually, in the novel quintupler circuit, the 2 bit, 4 bit and 8 bit entries are respectively delayed one time interval (i.e., the time interval between the decimal orders) so as to be multiplied by 10. The 1 bit entry of the quintupler circuit is connected to an input terminal of a 1 bit binary adder and to an input terminal of a 4 bit binary adder of a group of three binary adders, generally of the type, and connected as shown in Fig. 1 of the Byron L. Havens et al. U.S. patent application Serial No. 338,122 filed on February 20, 1953 and entitled Serial -Parallel Binary-Decimal Adder. The ten multiple of the 2 bit, 4 bit and 8 bit entries of the quintupler circuit are each shifted one binary column or order to the right thus effectively dividing them by 2. That is, the 2, 4 and 8 bit entires of the quintupler circuit are delayed one time interval (multiplied by 10) and shifted one binary column to the right (divided by 2) to represent the five multiple of said 2 bit, 4 bit, and 8 bit entries. The delaying of the 2 bit, 4 bit and 8 bit of the quintupler circuit is accomplished by delay circuits of the type disclosed in the Byron L. Havens Patent No. Re. 23,699. The shifting of the output of the delay circuits one binary column to the right is accomplished by connecting the tens multiple of the 2 bit to an input terminal of a 1 bit binary adder, the tens multiple of the 4 bit to an input terminal of a 2 bit binary adder, and the tens multiple of the 8 bit to an input terminal of a 4 bit binary adder. The binary adders may be generally of the type disclosed in the Byron L. Havens et al. U.S. patent application, Serial No. 338,122. The operation of the quintupler circuit which employs 1, 2 and 4 bit binary adders and additional delay circuits to properly present the output of the quintupler in binary-decimal notation, parallel by bit, serial by digit order (i.e., decimal order) will appear more clearly from the detailed description hereinafter.

*Product generator.*—The novel product generator employs a plurality of; delay circuits, binary-decimal adders, doubler circuits, and a quintupler circuit. The product generator accepts a decimal value expressed in binary-decimal notation parallel by bit, serial by digit order and with a delay of three time intervals presents simultaneously in parallel by bit, serial by digit order, the multiples one through nine of the decimal value accepted. The delay circuits embodied in the product generator may be generally of the type disclosed and claimed in the Byron L. Havens Patent No. Re. 23,699 entitled "Pulse Delay Circuit," granted August 18, 1953.

The binary-decimal adders embodied within the product generator may each be generally of the type disclosed and claimed in the Byron L. Havens et al. U. S. patent application, Serial No. 338,122 filed on February 20, 1953 and entitled "Serial-Parallel Binary-Decimal Adders." The doubler circuits employed by the product generator may each be of the novel type herein disclosed. The quintupler circuit employed by the product generator may be of the novel type herein disclosed. (The modified quintupler circuit shown in Fig. 1 is actually the novel quintupler circuit disclosed herein (Fig. 5) with delay circuits 31, 32 and 33 removed. It will be noted that the modified quintupler circuit of Fig. 1 employs the 2, 4, and 8 bit delay circuits of the four delay circuits labeled D21.)

The product generator employs a doubler circuit to render the two multiple of the entry thereto. The product generator then adds the two multiple and the entry to obtain the three multiple. The four multiple is obtained by employing a second doubler circuit for accepting the output of the first doubler circuit and rendering an output which is the four multiple. The five multiple is obtained by the use of the quintupler circuit herein disclosed. The six multiple is obtained by employing a doubler circuit that accepts as its input the three multiple and renders the six multiple as its output. The seven multiple is obtained by adding the four multiple and the three multiple. The eight multiple is obtained by employing a doubler circuit which accepts as its input the four multiple and renders as its output the eight multiple. The nine multiple is obtained by adding the four multiple and the five multiple. It will be appreciated that in order to obtain the one through nine multiples simultaneously, a plurality of delay circuits must be judiciously interconnected between the doubler, adder and quintupler circuits employed in the product generator.

Figures 2, 2A:
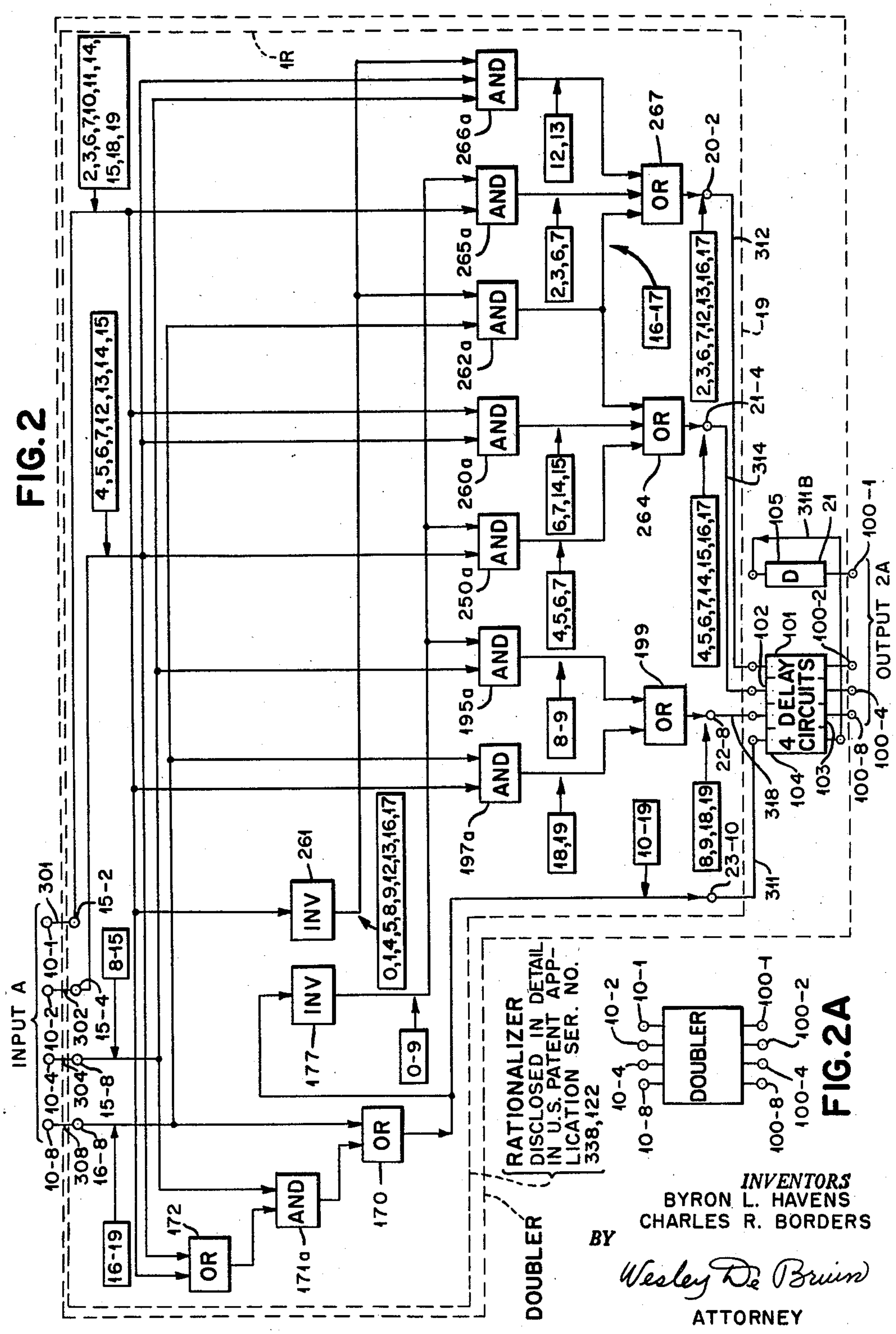
Figure 3:
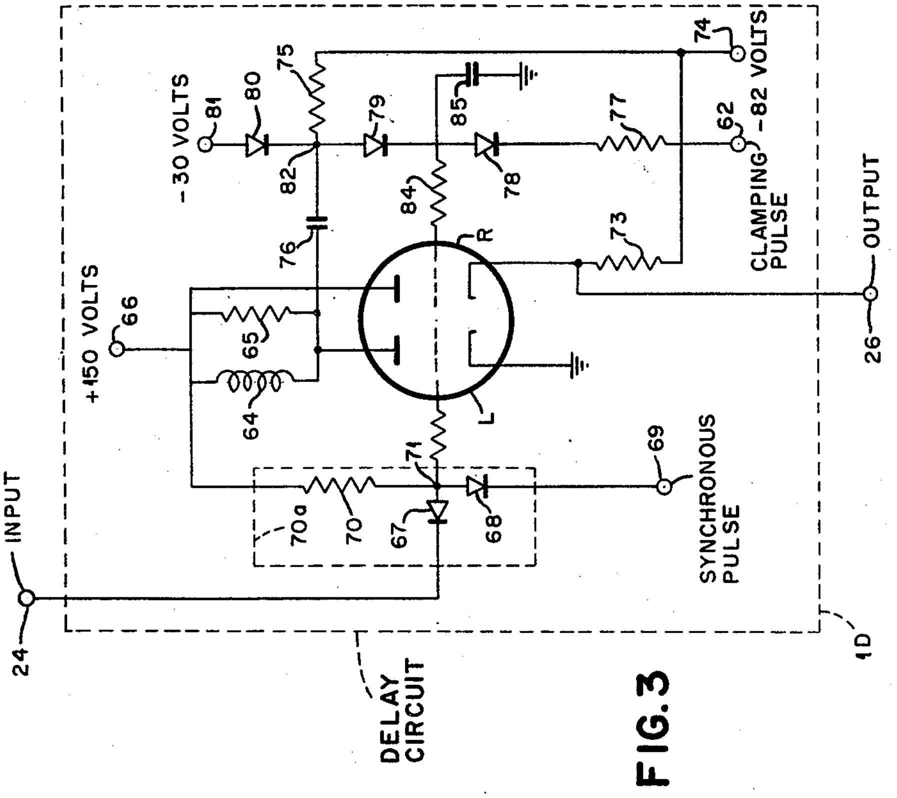
Figure 3A:
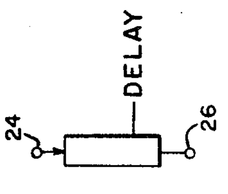
Figures 4, 4A:
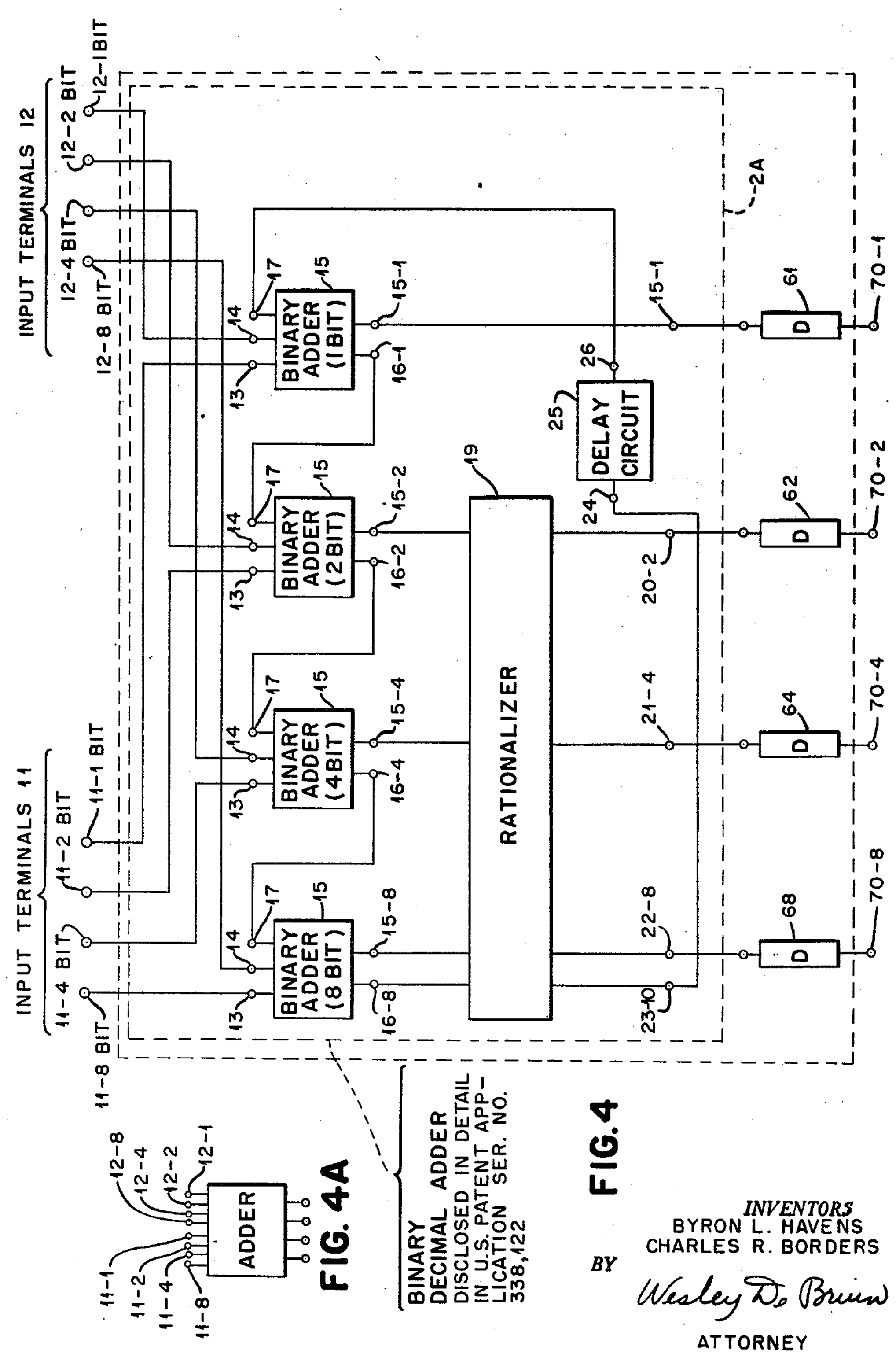
Figures 5, 5A:
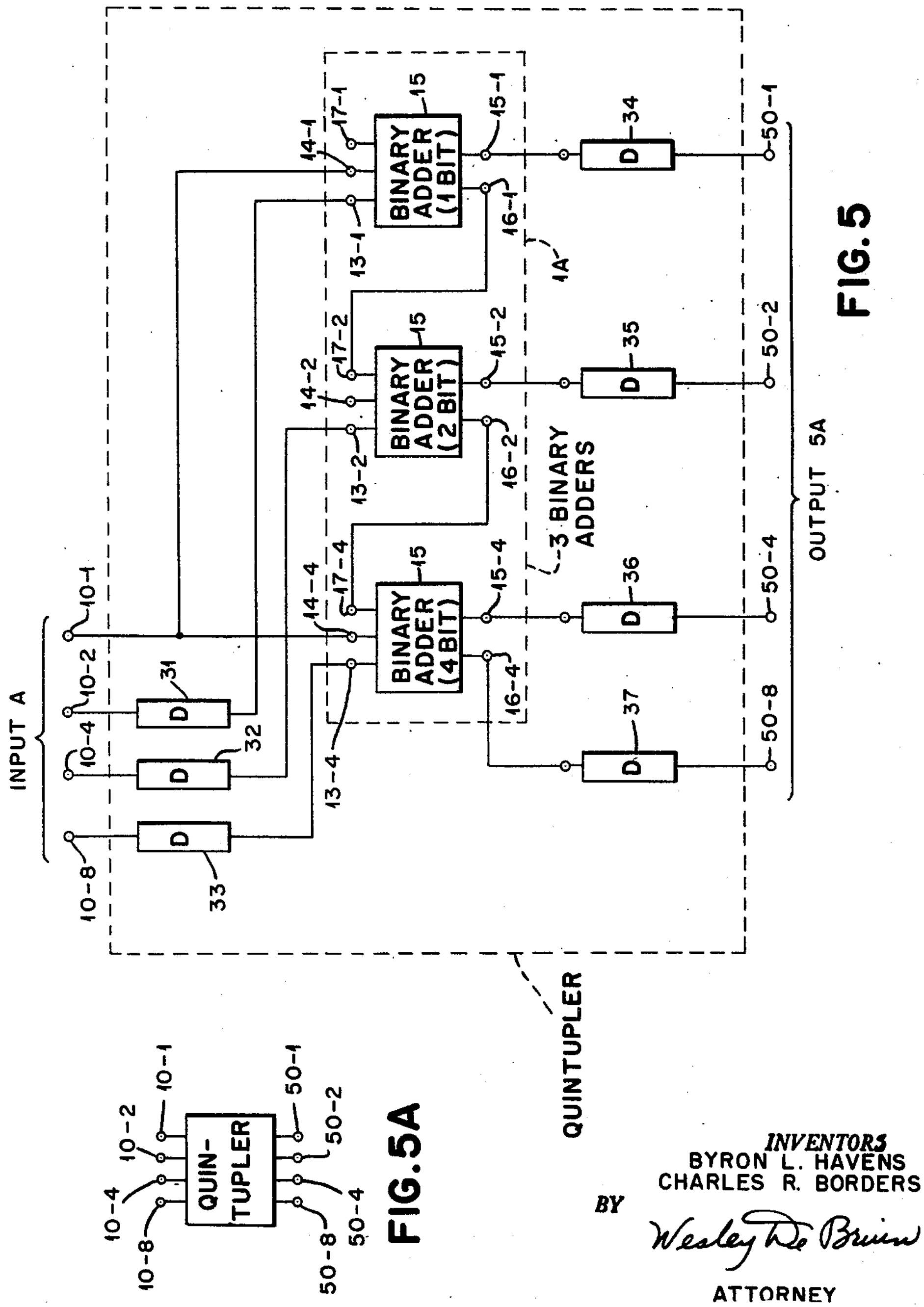

In the drawings:

Fig. 1 discloses a circuit diagram of the novel product generator;

Fig. 2 discloses the circuitry of the novel doubler circuit;

Fig. 2A discloses a block representative of the doubler circuit shown in Fig. 2;

Fig. 3 discloses a pulse delay circuit generally corresponding to that disclosed in the Byron L. Havens Patent No. Re. 23,699 granted August 18, 1953;

Fig. 3A discloses a block representative of the pulse delay circuit of Fig. 3;

Fig. 4 discloses the circuitry of the binary-decimal adder employed in the product generator;

Fig. 4A discloses a block representative of the binary-decimal adder of Fig. 4;

Fig. 5 discloses the circuitry of the novel quintupler circuit; and

Fig. 5A discloses a block representative of the quintupler circuit of Fig. 5.

*Binary-decimal adder.*—The binary-decimal adder employed in the novel product generator herein disclosed and claimed is shown in Fig. 4. The binary decimal adder enclosed within broken line 2A of Fig. 4 of this application corresponds identically to the binary-decimal adder of Fig. 1 of the Havens et al. patent application, Serial No. 338,122.

Briefly, the binary-decimal adder of Fig. 4 functions as follows: input terminals 11 consisting of a 1 bit, a 2 bit, a 4 bit and an 8 bit terminal and input terminals 12 consisting of a 1 bit, a 2 bit, a 4 bit and an 8 bit terminal, respectively accept, simultaneously, a first and second decimal value each expressed in binary-decimal notation parallel by bit, serial by digit order. Subject to a time delay of one microsecond output terminals 70–1 (1 bit), 70–2 (2 bit), 70–4 (4 bit) and 70–8 (8 bit) manifest in binary-decimal notation, parallel by bit, serial by digit order the sum of the first and second decimal values impressed on input terminals 11 and 12.

The adder of Fig. 4 has a time delay of one microsecond due to delay circuits 61, 62, 64 and 68. This one microsecond delay is included in the adder of Fig. 4 so that said adder will readily conform to the timing of the product generator of Fig. 1.

In summary, if a first decimal value is impressed on input terminals 11 simultaneously with a second decimal value impressed on input terminals 12, the sum of the first and second decimal values will be manifested at output terminals 70 subject to a time delay of one microsecond.

*Delay circuit.*—The delay circuit employed in the binary-decimal adder of Fig. 4, the novel doubler circuit of Fig. 2, the novel quintupler circuit of Fig. 5, and the novel product generator circuit of Fig. 1 is generally of the type disclosed in the Byron L. Havens U.S. Patent No. Re. 23,699, granted August 18, 1953 and entitled "Pulse Delay Circuit ." This delay circuit is also disclosed in the Havens et al. U.S. patent application, Serial No. 338,122 filed February 20, 1953 entitled "Serial-Parallel Binary-Decimal Adder." It will be appreciated that any circuit capable of performing the functions of the circuit disclosed and claimed in the Havens Reissue Patent No. Re. 23,699 could be utilized as the delay circuit in practicing the invention disclosed herein.

The output pulse of a Havens delay circuit is superior in form to the input pulse. This feature of the Havens delay circuit is utilized in the doubler circuit (Fig. 2), the quintupler circuit (Fig. 5), and the binary-decimal adder (Fig. 4).

Referring to Fig. 3 herein, the Havens delay circuit is shown as the circuitry enclosed within broken line 1D. As to the operation of the delay circuit of Fig. 3 it will suffice, in view of the complete disclosure of the Havens reissue patent and the Havens et al. U.S. patent application both referred to above, to merely point out that if a suitable positive pulse is impressed on input terminal 24, then one microsecond later output terminal 26 of the delay circuit will manifest a similar or improved pulse for one microsecond. In other words, if input terminal 24 is in the Up condition during a given microsecond interval, output terminal 26 will be in the Up condition during the following microsecond interval. It will be appreciated by those skilled in the art that the inherent timing of the Havens delay circuit may be varied; primarily by suitable choice of timing pulses and secondarily by suitable choice of circuit parameters. However, throughout the disclosure of the invention claimed in the instant application, the Havens delay circuit of Fig. 3 will have a one microsecond delay.

THE DOUBLER CIRCUIT

The doubler circuit shown in Fig. 2 has four input terminals labelled 10–1, 10–2, 10–4 and 10–8 which respectively accept a 1 bit, a 2 bit, a 4 bit and an 8 bit. The doubler circuit has four output terminals labelled 100–1, 100–2, 100–4 and 100–8 which respectively manifest the 1 bit, the 2 bit, the 4 bit and the 8 bit. It will be seen from Fig. 2, that input terminals 10–1, 10–2, 10–4 and 10–8 of the doubler circuit are respectively connected through leads 301, 302, 304 and 308 to terminals 15–2, 15–4, 15–8 and 16–8 of the rationalizer. The rationalizer being the circuitry enclosed within the broken line labelled 1R.

Still referring to Fig. 2, it will be seen that: terminal 20–2 of the rationalizer circuit is connected via lead 312 and delay circuit 101 to output terminal 100–2 of the doubler circuit; terminal 21–4 of the rationalizer circuit is connected via lead 314 and delay circuit 102 to output terminal 100–4 of the doubler circuit; terminal 22–8 of the rationalizer circuit is connected via lead 318 and delay circuit 103 to the output terminal 100–8 of the doubler circuit; and terminal 23–10 of the rationalizer circuit is connected via lead 311, delay circuit 104, lead 311B, and delay circuit 105 to output terminal 100–1 of the doubler circuit. (It will be seen from Fig. 2 that output terminals 100–1, 100–2, 100–4 and 100–8 of the doubler circuit are respectively the output terminals of delay circuits 105, 101, 102 and 103.) It will be appreciated that the doubler circuit of Fig. 2 would be operative with delay circuits 101 through 104 respectively shunted or replaced by wave shaping circuits.

*The rationalizer circuit.*—The rationalizer circuit, i.e., the circuitry enclosed within broken line 1R of Fig. 2, corresponds to Fig. 8 of, and is fully disclosed, described and claimed in, the Byron L. Havens et al. U.S. patent application, Serial No. 338,122 filed on February 20, 1953 and entitled "Serial-Parallel Binary-Decimal Adder." For purposes of understanding how the doubler circuit of Fig. 2 operates, it will be sufficient herein to merely describe the overall operation of the rationalizer circuit.

The rationalizer circuit functions in the following manner: when input terminal 15–2 only of the rationalizer circuit is in the Up condition, output terminal 20–2 only of the rationalizer circuit is in the Up condition; when input terminal 15–4 only of the rationalizer circuit is in the Up condition, output terminal 21–4 only of the rationalizer circuit is in the Up condition; when input terminals 15–2 and 15–4 only of the rationalizer circuit are respectively in the Up condition, output terminals 21–4 and 20–2 only of the rationalizer circuit are respectively in the Up condition; when input terminal 15–8 only of the rationalizer circuit is in the Up condition, output terminal 22–8 only of the rationalizer circuit is in the Up condition; when input terminals 15–8 and 15–2 only of the rationalizer are respectively in the Up condition, output terminal 23–10 only of the rationalizer circuit is in the Up condition; when input terminals 15–8 and 15–4 only of the rationalizer circuit are respectively in the Up condition, output terminals 23–10 and 20–2 only of the rationalizer circuit are respectively in the Up condition; when input terminals 15–8, 15–4 and 15–2 only of the rationalizer circuit are respectively in the Up condition, output terminals 23–10 and 21–4 only of the rationalizer circuit are respectively in the Up condition; when input terminal 16–8 only of the rationalizer circuit is in the Up condition, output terminals 23–10, 21–4 and 20–2 only of the rationalizer circuit are respectively in the Up condition; and when input terminals 16–8 and 15–2 only are respectively in the Up condition, output terminals 23–10 and 22–8 only of the rationalizer circuit are respectively in the Up condition.

Briefly, it may be stated that the rationalizer circuit of Fig. 2 (enclosed within broken line 1R) has a 2 bit input terminal, i.e., 15–2, a 4 bit input terminal, i.e., 15–4, an 8 bit input terminal, i.e., 15–8, a 16 bit input terminal, i.e., 16–8, a 2 bit output terminal, i.e., 20–2, a 4 bit output terminal, i.e., 21–4, an 8 bit output terminal, i.e., 22–8, and a 10 bit output terminal, i.e., 23–10.

Now from Fig. 2, it will be seen that the 1 bit input terminal of the doubler circuit is connected to the 2 bit input terminal of the rationalizer circuit, the 2 bit input terminal of the doubler circuit is connected to the 4 bit input terminal of the rationalizer circuit, the 4 bit input terminal of the doubler circuit is connected to the 8 bit input terminal of the rationalizer circuit, and the 8 bit input terminal of the doubler circuit is connected to the 16 bit input terminal of the rationalizer circuit.

It is to be noted that in between output terminals 20–2, 21–4 and 22–8 of the rationalizer circuit and output terminals 100–2, 100–4 and 100–8 of the doubler circuit there is respectively a single delay circuit, whereas between output terminal 23–10 of the rationalizer circuit and output terminal 100–1 of the doubler circuit there are two delay circuits.

An explanation of the operation of the doubler circuit will now be undertaken in conjunction with a number of examples. Throughout the following examples, terminals not respectively referred to as being in the Up condition are respectively in the Down condition.

*Example No. 1*

Let it be assumed that input terminal 10–1 of the doubler circuit of Fig. 2 is in the Up condition, i.e., the decimal value 1 impressed on the input terminals of the doubler circuit. It follows that if input terminal 10–1 is Up, terminal 15–2 of the rationalizer circuit is Up and terminal 20–2 of the rationalizer circuit will be in the Up condition. When terminal 20–2 is in the Up condition, output terminal 100–2 of the doubler circuit will be in the Up condition one microsecond later. Output terminal 100–2 of the doubler circuit of Fig. 2 manifests the 2 bit and when in the Up condition, under the conditions of Example No. 1, represents the decimal value 2.

*Example No. 2*

Under the conditions of Example No. 2 let it be assumed that input terminal 10–2 of the doubler circuit is in the Up condition. This represents a decimal value of 2 being impressed on the input of the doubler circuit and via lead 302 on terminal 15–4 of the rationalizer circuit. When terminal 15–4 of the rationalizer circuit is in the Up condition, terminal 21–4 of the rationalizer circuit is in the Up condition. Now it will be appreciated that output terminal 100–4 of the doubler circuit will be Up one microsecond after terminal 21–4 is Up. When terminal 100–4 of the doubler circuit is Up a decimal value of 4 is manifested under the conditions of Example No. 2.

*Example No. 3*

When input terminals 10–1 and 10–2 of the doubler circuit are respectively in the Up condition, terminals 15–2, 15–4, 20–2 and 21–4 of the rationalizer circuit are respectively in the Up condition. Since terminals 21–4 and 20–2 are respectively connected through delay circuits 102 and 101 to output terminals 100–4 and 100–2 of the doubler circuit, it will be appreciated that one microsecond after terminals 21–4 and 20–2 are respectively in the Up condition, terminals 100–4 and 100–2 will respectively be in the Up condition manifesting a decimal value of 6, i.e., a 2 bit and a 4 bit in the units order.

*Example No. 4*

Let it be assumed that a decimal value of 4 is impressed on the input terminals of the doubler circuit, i.e., input terminal 10–4 in the Up condition. This will result in terminals 15–8 and 22–8 of the rationalizer circuit being respectively in the Up condition. It will be appreciated that since output terminal 100–8 is connected via delay circuit 103 to terminal 22–8, that one microsecond after terminal 22–8 is in the Up condition, output terminal 100–8 of the doubler circuit will be in the Up condition manifesting the decimal value of 8, i.e., an 8 bit in the units order.

*Example No. 5*

When input terminals 10–1 and 10–4 of the doubler circuit are respectively in the Up condition a decimal value of 5 is impressed on the input thereof. With terminals 10–1 and 10–4 respectively in the Up condition, terminals 15–2, 15–8 and 23–10 of the rationalizer circuit will respectively be in the Up condition. Now from an inspection of Fig. 2 it will be appreciated that terminal 23–10, i.e., the 10 bit output terminal of the rationalizer is connected through delay circuits 104 and 105 to output terminal 100–1 of the doubler circuit. Thus 2 microseconds after terminal 23–10 is in the Up condition, output terminal 100–1 of the doubler circuit will be in the Up condition representing a decimal value of 10, i.e., a 1 bit in the tens order.

*Example No. 6*

Assuming that a decimal value of 6 is applied to the input terminals of the doubler circuit then terminals 15–8, 15–4, 20–2 and 23–10 of the rationalizer circuit will be respectively in the Up condition. One microsecond after terminal 20–2 is in the Up condition, output terminal 100–2 of the doubler circuit will be in the Up condition; manifesting the decimal value 2, i.e., a 2 bit in the units order. Two microseconds after terminal 23–10 is in the Up condition, output terminal 100–1 of the doubler circuit will be in the Up condition manifesting the decimal value 10, i.e., a 1 bit in the tens order. Thus it will be seen that an input of decimal value 6 results in an output of decimal value 12.

*Example No. 7*

Let it be assumed that the decimal value 7 is impressed on the input terminals of the doubler circuit. Then terminals 15–8, 15–4, 15–2, 23–10 and 21–4 of the rationalizer circuit are respectively in the Up condition. Now it will be appreciated that one microsecond after terminal 21–4 is in the Up condition, output terminal 100–4 of the doubler circuit is in the Up condition manifesting the decimal value 4, i.e., the 4 bit in the units order; and two microseconds after terminal 23–10 is in the Up condition, output terminal 100–1 of the doubler circuit will be in the Up condition manifesting the decimal value 10, i.e., a 1 bit in the tens order. Thus it will be appreciated that a decimal value 7 input results in a decimal value 14 output.

*Example No. 8*

When a decimal value of 8 is impressed on the input terminals of the doubler circuit terminals 16–8, 20–2, 21–4 and 23–10 of the rationalizer circuit will respectively be in the Up condition. Now it will be seen that one microsecond after terminals 20–2 and 21–4 are respectively in the Up condition, output terminals 100–2 and 100–4 will respectively be in the Up condition together manifesting a decimal value of 6, i.e., a 2 bit and a 4 bit in the units order; and that two microseconds after terminal 23–10 is in the Up condition, output terminal 100–1 of the doubler circuit will be in the Up condition manifesting a decimal value of 10, i.e., a 1 bit in the tens order. Thus it is seen that an input of decimal value 8 results in an output of decimal value 16.

*Example No. 9*

Let it be assumed that the decimal value 9 is impressed on the input terminals of the doubler circuit of Fig. 2. Then terminals 16–8, 15–2, 22–8 and 23–10 of the rationalizer circuit will respectively be in the Up condition. Now it will be appreciated that one microsecond after terminal 22–8 is in the Up condition, output terminal 100–8 of the doubler circuit will be in the Up condition manifesting a decimal value of 8, i.e., an 8 bit in the units order; and that two microseconds after terminal 23–10 is in the Up condition, output terminal 100–1 of the doubler circuit will be in the Up condition manifesting a decimal value of 10, i.e., a 1 bit in the tens order.

*Example No. 10*

Let it be assumed that a decimal value of 98 expressed in binary-decimal notation, parallel by bit, serial by decimal order is impressed on the input terminals of the doubler circuit of Fig. 2. Thus during a microsecond input terminal 10–8 of the doubler circuit will be in the Up condition. This will result (reference is made to Example No. 8 supra) in an output of decimal value 6 being manifested by terminals 100–2 and 100–4, respectively, being in the Up condition during the second microsecond. Further, as a result of the input of decimal value 8 during the first microsecond, output terminal 100–1 of the doubler circuit will be Up during the third microsecond manifesting a decimal value of 10, i.e., a 1 bit in the tens order. Thus it is seen that an input of decimal value 8 results in an output of decimal value 16.

Now in accordance with the conditions of this example, an input of decimal value 90, i.e., a 1 bit and an 8 bit in the tens order will be impressed on the input terminals of the doubler circuit of Fig. 2 during the second microsecond. That is, input terminals 10–1 and 10–8 of the doubler circuit will respectively be in the Up condition during the second microsecond. This will result (reference is made to Example No. 9 supra) in an output of decimal value 80, i.e., output terminal 100–8 of the doubler circuit in the Up condition during the third microsecond (that is, an 8 bit in the tens order of the output) and an output of decimal value 100, i.e., output terminal 100–1 is Up, during the fourth microsecond (that is, the presence of a 1 bit in the hundreds order).

It will now be apparent that when a multi-order decimal value is impressed on the input terminals of the doubler circuit of Fig. 2, an output of double said multi-order quantity will be manifested by the output terminals of said doubler circuit in binary-decimal notation, parallel by bit, serial by digit order.

Once again referring to the instant example, it will be appreciated that this example is nothing more than Example Nos. 8 and 9 taken in serial order. That is, with a one microsecond interval between Examples 8 and 9 as is consistent with the timing of the illustrative embodiments of not only the doubler circuit but the quintupler circuit and product generator as well.

To briefly summarize, an input of decimal value 8 during the first microsecond and an input of decimal value 90 during the second microsecond results in an output of decimal value 6 during the second microsecond, an output of decimal value 90 during the third microsecond and an output of decimal value 100 during the fourth microsecond, when applied to the doubler circuit of Fig. 2.

Now with respect to all the foregoing examples, it is to be noted than an input of any decimal value, one through nine, expressed in binary-decimal notation and applied to the input terminals of the doubler circuit results in an output of twice the decimal value applied to the input terminals and expressed in binary-decimal notation, i.e., parallel by bit and serially by digit appearing at the output terminals of the doubler circuit. It will be obvious to those skilled in the art that the doubler circuit of Fig. 2 will effectively accept any decimal quantity and render double said decimal quantity as its output.

*Brief summary of the operation of the doubler circuit of Fig. 2.*—The decimal value impressed on the input terminals of the doubler circuit is expressed in binary-decimal notation. It is effectively doubled and expressed in pure binary notation by column shifting to the left one position. The double quantity expressed in binary notation is impressed on the input terminals of the rationalizer circuit 1R. The rationalizer circuit accepts a pure binary input and renders a 2, 4, 8 and 10 bit output manifestation of the doubled quantity. However, the 2, 4 and 8 bit output terminals of the rationalizer are of a first or unit decimal order, whereas the remaining terminal, 23–10, is actually the 1 bit of the next higher or tens decimal order. Now by subjecting the output from terminal 23–10 to an additional time delay, the output of the doubler circuit is obtained in parallel by bit, serial by digit order.

A number of embodiments of a rationalizer circuit that could be used in the novel doubler circuit of Fig. 2 are fully shown and disclosed in the Byron L. Havens et al. patent application, Serial No. 338,122, filed on February 20, 1953, and entitled "Serial-Parallel Binary-Decimal Adder." The delay circuits employed in the novel doubler circuit may each be generally of the type disclosed and claimed in the Byron L. Havens Patent No. Re. 23,699 granted August 18, 1953 and entitled "Pulse Delay Circuit."

THE QUINTUPLER CIRCUIT

The quintupler circuit of Fig. 5 employs a 1 bit binary adder, a 2 bit binary adder and a 4 bit binary adder. The three binary adders are enclosed within broken line 1A. The circuitry enclosed within broken line 1A may be substantially identical with a portion of that disclosed in the Byron L. Havens et al. U.S. patent application, Serial No. 338,122, filed February 20, 1953, and entitled "Serial-Parallel Binary-Decimal Adder." The 1 bit binary adder, the 2 bit binary adder, and the 4 bit binary adder enclosed within the broken line labelled 1A are similar and the detailed circuitry of each is disclosed in the above-referred to Byron L. Havens et al. U.S. patent application. The carry output terminal 16–1 of the 1 bit binary adder is connected to input terminal 17–2 of the 2 bit binary adder; the carry output terminal 16–2 of the 2 bit binary adder is connected to the input terminal 17–4 of the 4 bit binary adder; and the carry output terminal 16–4 of the 4 bit binary adder is connected to the input terminal of delay circuit 37. The sum output terminals of the 1 bit, 2 bit, and 4 bit binary adders are respectively connected through delay circuits 34, 35 and 36 to output terminals 50–1, 50–2 and 50–4 of the quintupler circuit. The carry output terminal of the 4 bit binary adder is connected through delay circuit 37 to output terminal 50–8 of the quintupler circuit. The 1 bit input terminal 10–1 of the quintupler circuit is connected to input terminal 14–1 of the 1 bit binary adder and input terminal 14–4 of the 4 bit binary adder; the 2 bit input terminal 10–2 of the quintupler circuit is connected through delay circuit 31 to input terminal 13–1 of the 1 bit binary adder; the 4 bit input terminal 10–4 of the quintupler circuit is connected through delay circuit 32 to input terminal 13–2 of the 2 bit binary adder; and the 8 bit input terminal 10–8 of the quintupler circuit is connected through delay circuit 33 to input terminal 13–4 of the 4 bit binary adder. It will be noted that terminal 17–1 of the 1 bit binary adder and terminal 14–2 of the 2 bit binary adder are left unconnected.

The delay circuits 34 through 37 shown in Fig. 5 as an integral part of the quintupler circuit may be omitted and the quintupler circuit will function satisfactorily. However, delay circuits 34 through 37 improve the shape of the output pulses of the quintupler circuit.

Briefly each binary adder functions as follows: when all three input terminals are respectively in the Up condition, both the sum and carry output terminals are in the Up condition. When only any two of the three input terminals of the binary adder are respectively in the Up condition, only the carry output terminal will be in the Up condition. When only any one of the three input terminals of the binary adder is in the Up condition, only the sum output terminal will be in the Up condition. Terminals 15–1, 15–2 and 15–4 are respectively the sum output terminals and terminals 16–1, 16–2 and 16–4 are respectively the carry output terminals of the 1 bit, 2 bit and 4 bit binary adders.

The explanation of how the quintupler circuit of Fig. 5 functions will now be undertaken in conjunction with a number of examples.

*Example No. 1*

Assume the decimal value 1, i.e., terminal 10–1 in the Up condition, is impressed on the input terminals of the quintupler circuit. This will result in terminal 14–1 of the 1 bit binary adder and terminal 14–4 of the 4 bit binary adder being respectively in the Up condition. When only one input terminal of the 1 bit and the 4 bit binary adders, respectively, is in its Up condition, the sum output terminals 15–1 of the 1 bit binary adder and 15–4 of the 4 bit binary adder will respectively be in the Up condition. Now from Fig. 5 it will be apparent that one microsecond after terminal 15–1 is in the Up condition, output terminal 50–1 (the 1 bit output terminal of the quintupler circuit) will be in the Up condition, and that one microsecond after terminal 15–4 is in the Up condition, output terminal 50–4 (the 4 bit output terminal of the quintupler circuit) will be in the Up condition. When the output terminals 50–4 and 50–1 of the quintupler circuit are respectively in the Up condition one microsecond after an input is impressed on the input terminals of the quintupler circuit, they represent the decimal value 5.

*Example No. 2*

When the decimal value 2, i.e., terminal 10–2 in the Up condition, is impressed on the input terminals of the quintupler circuit then one microsecond later terminal 13–1 of the 1 bit binary adder will be in the Up condition. With input terminal 13–1 of the 1 bit binary adder in the Up condition, the sum output terminal 15–1 of said binary adder will be in the Up condition. From Fig. 5 it will be seen that one microsecond after terminal 15–1 is in the Up condition, output terminal 50–1 of the quintupler circuit will be in the Up condition. Now it will be appreciated that the quintupler circuit of Fig. 5 accepts a decimal value in binary-decimal notation parallel by bit, serial by digit order. Thus delay circuit 31 effectively multiplies by 10 the 2 bit entry and applies it to the 1 bit binary adder. The application of the output of delay circuit 31 to the 1 bit binary adder effectively shifts the binary-decimal order of input terminal 10–2 of the quintupler circuit one binary column to the right (divides by 2). Thus it will be seen that the rendition of output terminal 50–1 of the quintupler circuit in the Up condition two microseconds after input terminal 10–2 was in the Up condition represents a decimal value of 10, i.e., a 1 bit in the tens order.

*Example No. 3*

Assume the decimal value 3 is impressed on the input terminals of the quintupler circuit of Fig. 5, i.e., input terminals 10–1 and 10–2 are respectively in the Up condition. When input terminal 10–1 is in the Up condition, it will result in input terminal 14–1 of the 1 bit binary adder and input terminal 14–4 of the 4 bit binary adder being simultaneously in the Up condition. When only one input terminal of the 1 bit binary adder is in the Up condition and only one input terminal of the 4 bit binary adder is in the Up condition, then sum output terminal 15–1 and sum output terminal 15–4 will respectively be in the Up condition. One microsecond after terminal 15–1 is in the Up condition, output terminal 50–1 of the quintupler circuit will be in the Up condition and one microsecond after terminal 15–4 is in the Up condition, output terminal 50–4 of the quintupler circuit will be in the Up condition. Thus it is seen that as a result of input terminal 10–1 of the quintupler circuit being in its Up condition one microsecond later output terminals 50–1 and 50–4 of the quintupler circuit are respectively in the Up condition manifesting a decimal value of 5. Now it will be appreciated that under the conditions of Example No. 3 terminals 10–1 and 10–2 were simultaneously in the Up condition. However, because of delay circuit 31 input terminal 13–1 of the 1 bit binary adder will be in its Up condition one microsecond after input terminal 10–2 and 10–1 were respectively in the Up condition. When only input terminal 13–1 of the 1 bit binary adder is in the Up condition, then only sum output terminal 15–1 of the 1 bit binary adder will be in the Up condition. Now one microsecond after terminal 15–1 of the 1 bit binary adder and two microseconds, i.e., delay circuits 31 and 34, after input terminal 10–2 of the quintupler circuit is in the Up condition, output terminal 50–1 of the quintupler circuit will be in the Up condition manifesting a decimal value of 10, i.e., a 1 bit in the tens order. Thus it will be appreciated that with an input of decimal value 3, terminals 10–1 and 10–2 respectively in the Up condition, output terminals 50–4 and 50–1 will be Up during the units order time interval of the output, whereas output terminal 50–1 will be Up one microsecond later during the tens order time interval of the output. It is apparent now that the quintupler circuit presents the five multiple of the decimal value 3 by the presence of a 1 and 4 bit during the units order time interval of the output and the presence of a 1 bit during the tens order time interval of the output, i.e., the output of the quintupler circuit is parallel by bit, serial by digit order.

*Example No. 4*

Assume the decimal value 4 is impressed on the input terminals of the quintupler circuit of Fig. 5, i.e., input terminal 10–4 in the Up condition. One microsecond after input terminal 10–4 of the quintupler circuit is in the Up condition, input terminal 13–2 of the 2 bit binary adder will be in the Up condition. When only one, namely, terminal 13–2, of the input terminals of the 2 bit binary adder is in the Up condition then sum output terminal 15–2 of said binary adder will be in the Up condition. One microsecond after terminal 15–2 is in the Up condition, output terminal 50–2 of the quintupler circuit will be in the Up condition, manifesting the decimal value 20, i.e., the presence of a 2 bit in the tens order. To briefly summarize: It will be seen that two microseconds after input terminal 10–4 of the quintupler is in the Up condition, output terminal 50–2 of the quintupler is in the Up condition. Now it is to be appreciated that a one microsecond time interval between the input and output of the quintupler circuit is indicative of the same decimal order being impressed on the input as appears at the output terminals of the quintupler circuit one microsecond later. Thus, if a decimal value expressed in binary-decimal notation is manifested by the output terminals, two microseconds after the input to the quintupler circuit, the output will be of one higher decimal order than the input.

*Example No. 5*

Assume the decimal value 5 is impressed on the input terminals of the quintupler circuit of Fig. 5, i.e., input terminals 10–1 and 10–4 are simultaneously in the Up condition. Now as pointed out in Example No. 1, when input terminal 10–1 is in the Up condition, one microsecond later output terminals 50–1 and 50–4 of the quintupler circuit will respectively be in the Up condition manifesting the decimal value 5, i.e., presence of a 1 bit and a 4 bit in the units decimal order. Now referring back to Example No. 4, it will be appreciated that two microseconds after input terminal 10–4 is in the Up condition, output terminal 50–2 will be in the Up condition manifesting the decimal value 20, i.e., the presence of a 2 bit in the tens decimal order. In other words, it will be seen that under the conditions of Example No. 5, input terminals 10–1 and 10–4 are simultaneously Up. That when input terminal 10–1 is Up, terminals 14–1 and 14–4 will be Up at the same time, whereas terminal 13–2 will be Up one microsecond after input terminal 10–4 as a result of delay circuit 32 being connected between terminals 10–4 and 13–2. Thus, one microsecond after terminal 10–1 is Up, due to the respective delays of delay circuits 34 and 36, output terminals 50–1 and 50–4 will respectively be in the Up condition, whereas two microseconds after terminal 10–4 is Up, due to the cumulative delays of delay circuits 32 and 35, output terminal 50–2 will be in the Up condition.

*Example No. 6*

Assume the decimal value 6 is impressed on the input terminals of the quintupler circuit of Fig. 5, i.e., input terminals 10–4 and 10–2 are respectively in the Up condition. Actually, this example is nothing more than the concurrence of the conditions of Example No. 2 and Example No. 4. That is, two microseconds after input terminals 10–4 and 10–2 are respectively in the Up condition, output terminals 50–1 and 50–2 will respectively be in the Up condition manifesting the decimal value 30, i.e., the presence of a 1 bit and a 2 bit in the tens decimal order. It will be appreciated that under the conditions of this example, during the units decimal order time interval of the output, all of the output terminals of the quintupler circuit are respectively in the Down condition.

*Example No. 7*

Assume the decimal value 7 is impressed on the input terminals of the quintupler circuit of Fig. 5, i.e., input terminals 10–1, 10–2 and 10–4 are respectively in the Up condition. Actually, this example is nothing more than the concurrence of the conditions of Examples No. 1, No. 2 and No. 4. That is, one microsecond after terminal 10–1 is in its Up condition, output terminals 50–1 and 50–4 will respectively be in the Up condition manifesting a decimal value of 5; two microseconds after terminals 10–2 and 10–4 are respectively in the Up condition, output terminals 50–2 and 50–1 will respectively be in the Up condition manifesting the decimal value 30.

*Example No. 8*

Assume the decimal value 8 is impressed on the input terminals of the quintupler circuit of Fig. 5, i.e., input terminal 10–8 in the Up condition. Then it will be apparent, due to the cumulative delay introduced by delay circuits 33 and 36, that two microseconds later output terminal 50–4 will be in the Up condition manifesting the decimal value 40, i.e., the presence of a 4 bit in the tens decimal order.

*Example No. 9*

Assume the decimal value 9 is impressed on the input terminals of the quintupler circuit of Fig. 5, i.e., input terminals 10–1 and 10–8 are respectively in the Up condition. Actually, this example is nothing more than the concurrence of the conditions of Examples No. 1 and No. 8. That is, one microsecond after input terminal 10–1 is in the Up condition, output terminals 50–1 and 50–4 will respectively be in the Up condition manifesting the decimal value 5; two microseconds after input terminal 10–8 is in the Up condition, output terminal 50–4 will be in the Up condition manifesting the decimal value 40.

*Example No. 10*

Assume that a decimal value of 36 in binary decimal notation, parallel by bit, serial by decimal order is impressed on the input terminals of the quintupler circuit of Fig. 5. That is, input terminals 10–2 and 10–4 of the quintupler circuit will be respectively in the Up condition during a first microsecond and input terminals 10–1 and 10–2 will be respectively in the Up condition during a second microsecond. Now appreciating the part that delay circuits 31, 32 and 33 play in the operation of the quintupler circuit, it will be apparent that as a result of input terminals 10–2 and 10–4 being respectively in the Up condition during a first microsecond and input terminal 10–1 being in the Up condition during a second microsecond that input terminals 14–1 and 13–1 of the 1 bit binary adder, input terminal 13–2 of the 2 bit binary adder and input terminal 14–4 of the 4 bit binary adder will be simultaneously in the Up condition during the second microsecond. Since two of the inputs of the 1 bit binary adder are Up a carry from the 1 bit binary adder in conjunction with one of the inputs of the 2 bit binary adder being Up, results in a carry to the 4 bit binary adder. A carry to the 4 bit binary adder in conjunction with one of the inputs of the 4 bit binary adder being Up, results in a carry output from the 4 bit binary adder. As previously pointed out, all this occurs during the second microsecond. The output pulse from the carry bit terminal of the 4 bit binary adder is delayed one microsecond by delay circuit 37 and appears at output terminal 50–8 of the quintupler circuit as an 8 bit in the tens order, i.e., an 8 bit during the third microsecond.

As stated earlier under the conditions of this example, input terminal 10–2 of the quintupler circuit is Up during the second microsecond. This will result, due to the cumulative delay of delay circuits 31 and 34, in an output by the quintupler circuit of a 1 bit during the hundreds order, i.e., a 1 bit manifested by output terminal 50–1 being in the Up condition during the fourth microsecond.

It will be appreciated that the present example is nothing more than Examples No. 6 and No. 3 taken in serial order.

It will be apparent from the preceding example, that the quintupler circuit of Fig. 5 will readily accommodate any decimal value provided it is impressed on the input terminals in binary-decimal notation, parallel by bit, serial by decimal order.

Now with respect to the first nine of the foregoing examples, it is to be noted that an input of any decimal value, one through nine, expressed in binary-decimal notation and applied to the input terminals of the quintupler circuit results in an output of the five multiple of the decimal value applied to the input terminals and expressed in binary-decimal notation, i.e., parallel by bit, serial by digit order appearing at the output terminals of the quintupler circuit. Example No. 10 above, shows generally how the quintupler circuit of Fig. 5 is capable of handling a multi-order input. Although the number of examples of necessity is limited, it will be obvious to those skilled in the art that the quintupler circuit of Fig. 5 will effectively accept any decimal value and render the five multiple of said decimal value as its output.

PRODUCT GENERATOR

The product generator shown in Fig. 1 employs a plurality of delay circuits (Fig. 3), a plurality of doubler circuits (Fig. 2), a plurality of binary-decimal adders (Fig. 4), and a modified quintupler circuit. The modified quintupler circuit is the quintupler circuit of Fig. 5 with delay circuits 31, 32 and 33 thereof omitted and utilizing in their place the 2, 4 and 8 bit delays of the four delays D21 of Fig. 1.

From Fig. 1, it will be seen that the input terminals 1A′ of the product generator consists of a 1 bit terminal, a 2 bit terminal, a 4 bit terminal and an 8 bit terminal. Still referring to Fig. 1, it will be seen that the output terminals of the product generator consist of nine groups, labelled 1A through 9A respectively, each group including a 1 bit terminal, a 2 bit terminal, a 4 bit terminal and an 8 bit terminal. The one multiple will appear on output terminals 1A simultaneously with: the two multiple appearing on the output terminals 2A; the three multiple appearing on output terminals 3A;

and the four through nine multiples respectively appearing on output terminals 4A through 9A.

The one through nine multiples of the input to the product generator simultaneously appear at the output terminals thereof three microseconds, or three time intervals, after the input thereto. As to the one multiple, the delays are introduced by the three groups of four delay circuits each, namely, D11, D21 and D31. Now it will be recalled from an earlier discussion of, the binary-decimal adder of Fig. 4, the doubler circuit of Fig. 2, and the quintupler circuit of Fig. 5, that each of these circuits has an inherent delay of one microsecond (one time interval). Thus from an inspection of Fig. 1, it will be seen that the three microsecond delay of the two multiple is due to the serial connection of doubler circuit DL2, and delay circuits D22 and D32. As to the three multiple, the three microsecond delay is due jointly to, delay circuits D11 and doubler circuit DL2, adder A3, and delay circuits D33. As to the four multiple, the three microsecond or three time interval delay is due to doubler circuit DL2, doubler circuit DL4, and delay circuits D34. As to the five multiple, the three microsecond delay is due to delay circuits D11, modified quintupler circuit MQ, and delay circuits D35. As to the six multiple, the three microsecond delay is due jointly to, delay circuits D11 and doubler circuit DL2, adder A3, and doubler circuit DL6. As to the seven multiple, the three microsecond delay is due jointly to delay circuits D11 and doubler circuit DL2, jointly to adder A3 and doubler circuit DL4, and adder A7. As to the eight multiple, the three microsecond delay is due to, doubler circuit DL2, doubler circuit DL4, and doubler circuit DL8. As to the nine multiple, the three microsecond delay, or three time interval delay, is due jointly to delay circuits D11 and doubler circuit DL2, jointly to doubler circuit DL4 and modified quintupler circuit MQ, and to adder A9.

If leads of the 500 series, shown in Fig. 1, manifest a decimal value during a first microsecond, then information based on said decimal value will be first manifested on leads of the 600 series during a second microsecond, and information based on said decimal value will be first manifested on leads of the 700 series during the third microsecond. That is, there is a one microsecond delay or time interval between leads of the 500 series and leads of the 600 series, and a one microsecond delay or time interval between leads of the 600 and 700 series. For example, assume lead 501 is in the Up condition during a first microsecond, then one microsecond later certain leads of the 600 series will respectively be in the Up condition and two microseconds later certain leads of the 700 series will respectively be in the Up condition.

A detailed explanation of the operation of the product generator of Fig. 1 will now be undertaken in conjunction with a number of examples.

*Example No. 1*

Assume a decimal value of 1 is impressed on the input terminals 1A' of the products generator. Then leads 501 and 511 will respectively be in the Up condition as will input terminal 24 of the 1 bit delay circuit of delay circuits D11 and input terminal 10–1 of doubler circuit DL2. One microsecond later, output terminal 26 of the 1 bit delay circuit of delay circuits D11 and output terminal 100–2, i.e., the 2 bit terminal of doubler circuit DL2 will respectively be in the Up condition. Now as seen from Fig. 1, terminal 100–2 of doubler circuit DL2 is connected via lead 612 to the input terminal of the 2 bit delay circuit of delay circuits D22, and via lead 612 and lead 622 to input terminal 10–2, i.e., the 2 bit input terminal of doubler circuit DL4. It will be seen that when leads 601 and 612 are respectively in the Up condition, then input terminals 11–1 (1 bit) and 12–2 (2 bit) of binary-decimal adder A3 will respectively be in the Up condition. That is, adder A3 adds a 1 bit and a 2 bit under the conditions of this example. It will be also noted that when lead 601 is in the Up condition, lead 601A is in the Up condition resulting in input terminal 10–1 (the 1 bit terminal) of modified quintupler MQ being in its Up condition. Two microseconds after the 1 bit terminal of input terminals 1A' of the product generator is in the Up condition, the output terminal of the 1 bit delay circuit of delay circuits D21 will be in the Up condition, the output terminal of the 2 bit delay circuit of delay circuits D22 will be in the Up condition, output terminals 70–1 and 70–2 of adder A3 will respectively be in the Up condition, and output terminal 100–4 of doubler circuit DL4 will be in the Up condition. Also the output terminals 50–1 (the 1 bit) and 50–4 (the 4 bit) of the modified quintupler circuit MQ will each be in the Up condition two microseconds after the 1 bit terminal of input terminals 1A' of the product generator is in the Up condition.

*To briefly summarize.*—With the output terminal of the 1 bit delay circuit of delay circuits D21 in the Up condition, lead 701 will be in the Up condition manifesting the presence of a 1 bit (decimal value 1). With the output terminal of the 2 bit delay circuit of delay circuits D22 in the Up condition, lead 712 will be Up manifesting the presence of a 2 bit (decimal value 2). With terminals 70–1 and 70–2 of adder A3 respectively in the Up condition, leads 741 and 742 will respectively be in the Up condition manifesting the presence of a 1 bit and a 2 bit (decimal value 3). With output terminal 100–4 of doubler circuit DL4 in the Up condition, lead 754 will be in the Up condition manifesting the presence of a 4 bit (decimal value 4). With output terminals 50–1 and 50–4 of the modified quintupler circuit MQ respectively in the Up condition, leads 761 and 764 will each be in the Up condition manifesting the presence of a 1 bit and a 4 bit (decimal value 5). The above conditions exist two microseconds, or two time intervals, after a decimal value of 1 has been impressed on the input terminals of the product generator.

Now as a result of lead 701 being in the Up condition, one microsecond later the 1 bit terminal of output terminals 1A will be in the Up condition indicating the decimal value 1. In like manner, as a result of lead 712 being in the Up condition, one microsecond later the 2 bit terminal of output terminals 2A will be in the Up condition indicating the decimal value 2. Further, one microsecond after leads 741 and 742 are respectively in the Up condition, the 1 bit and the 2 bit output terminals of the 3A group of output terminals will respectively be in the Up condition indicating a decimal value of 3. In like manner, one microsecond after lead 754 is in the Up condition, the 4 bit output terminal of the 4A group of output terminals will be in the Up condition indicating a decimal value of 4. One microsecond after leads 764 and 761 are respectively in the Up condition, the 4 bit and the 1 bit output terminals of the 5A group of output terminals will respectively be in the Up condition indicating the decimal value 5.

Now still referring to Fig. 1, it will be seen that when leads 741 and 742 are respectively in the Up condition, input terminals 10–1 and 10–2 of doubler circuit DL6 will respectively be in the Up condition since lead 781 connects terminal 10–1 of DL6 to lead 741, and lead 782 connects terminal 10–2 of DL6 to lead 742. One microsecond after terminals 10–2 and 10–1 of the doubler circuit DL6 are respectively in the Up condition, the 2 bit and 4 bit output terminals of the 6A group of output terminals will respectively be in the Up condition manifesting the decimal value 6. Still referring to Fig. 1, it will be seen that when leads 741 and 742 are respectively in the Up condition, input terminals 11–1 and 11–2 of adder A7 will respectively be in the Up condition since lead 791 connects terminal 11–1 and lead 741, and lead 792 connects terminal 11–2 and lead 742. Also, it will be appreciated that with lead 754 in the Up condition, input terminal 12–4 of adder A7 will be in the Up condition since lead 724 connects terminal 12–4 and lead 754. Actually a 4 bit, a 1 bit and a 2 bit are simultaneously impressed on the inputs of adder A7 and therefore one microsecond later, the 1, 2 and 4 bit output terminals of the 7A group of output terminals will respectively be in the Up condition indicating the decimal value 7. Now taking cognizance of the fact that when lead 754 is in the Up condition, terminal 10–4 of doubler circuit DL8 will be in the Up condition, it will be appreciated that one microsecond later the 8 bit terminal of the 8A group of output terminals will be in the Up condition indicating a decimal value of 8. Now viewing adder A9, it will be seen that when lead 754 is in the Up condition, input terminal 11–4 of adder A9 will be in the Up condition since lead 724 connects terminal 11–4 and lead 754. Also, terminals 12–1 and 12–4 of adder A9 will respectively be in the Up condition since leads 771 and 774 respectively connect the afore-recited terminals with leads 761 and 764. Thus, one microsecond later, the 1 bit and the 8 bit terminals of the 9A group of output terminals will respectively be in the Up condition indicating a decimal value of 9.

From the foregoing explanation, it is apparent that three microseconds after a decimal value of 1 is impressed on input terminals 1A' of the product generator, a decimal value of 1, i.e., the 1 multiple, appears at output terminals 1A; a decimal value of 2, i.e., the 2 multiple, appears at output terminals 2A; and corresponding values, i.e., corresponding to multiples three through nine, respectively appear at output terminals 3A through 9A.

It is to be noted at this point that all of the outputs (i.e., multiples appearing at terminals 1A through 9A) are in the units order under the condition of this example. However, as will appear more clearly from an example, that follows, if the outputs (i.e., multiples) were greater than 9 they would appear at the respective groups of output terminals in parallel by bit, serial by digit order. That is, three microseconds after the input to the product generator of a decimal value equal to 9 or less, the units decimal order would appear parallel by bit at the output terminals. During the next, namely, the fourth microsecond after the units decimal input interval, the tens decimal order would appear at the output terminals. In like manner the thousandths decimal order would appear during the fifth microsecond after the units decimal input interval. As will be apparent, in order to have any output in the hundreds or thousandths decimal orders the entries to the product generator would have to be of a magnitude well greater than 9 and applied in parallel by bit, serial by digit order.

*Example No. 2*

Assume the decimal value 3 is impressed on the input terminals 1A' of the product generator. Then three microseconds later: the one multiple of the input, namely, decimal value 3, will appear on output terminals 1A of the product generator; the two multiple of the input, namely, decimal value 6, will appear on output terminals 2A of the product generator; the three multiple of the input, namely, decimal value 9, will appear on output terminals 3A of the product generator; the units order portion of the four multiple of the input, namely, decimal value 2, will appear on output terminals 4A of the product generator; the units order portion of the five multiple of the input, namely, decimal value 5, will appear on the output terminals 5A of the product generator; the units order portion of the six multiple of the input, namely, decimal value 8, will appear on the output terminals 6A of the product generator; the units order portion of the seven multiple of the input, namely, decimal value 1, will appear on the output terminals 7A; the units order portion of the eight multiple of the input, namely, decimal value 4, will appear on the output terminals 8A of the product generator; and the units order portion of the nine multiple of the input, namely, decimal value 7 will appear on the output terminals 9A.

Then 4 microseconds later (i.e., after a decimal value of 3 is impressed on the input terminals 1A'): output terminals 1A, 2A and 3A will respectively manifest a decimal output of 0; output terminals 4A will manifest a decimal output of 10; output terminals 5A will manifest a decimal output of 10; output terminals 6A will manifest a decimal output of 10; output terminals 7A will manifest a decimal output of 20; output terminals 8A will manifest a decimal output of 20; and output terminals 9A will manifest a decimal output of 20.

Thus it will be apparent that the sum of the outputs appearing at the respective output terminals of the product generator during the third and fourth microseconds will be as follows: output terminals 1A will manifest a decimal value of 3; output terminals 2A will manifest a decimal value of 6; output terminals 3A will manifest a decimal value of 9; output terminals 4A will manifest a decimal value of 12, the sum of decimal values 2 and 10; output terminals 5A will manifest a decimal value of 15, the sum of decimal values 5 and 10; output terminals 6A will manifest a decimal value of 18, the sum of decimal values 8 and 10; output terminals 7A will manifest a decimal value of 21, the sum of decimal values 1 and 20; output terminals 8A will manifest a decimal value of 24, the sum of decimal values 4 and 20; and output terminals 9A will manifest a decimal value of 27, the sum of decimal values 7 and 20.

*Brief summary of the operation of the product generator of Fig. 1.*—From the foregoing examples, it will be apparent that the product generator of Fig. 1 accepts an input in binary-decimal notation, parallel by bit, serial by digit, and three microseconds thereafter manifests the portions of the one through nine multiples of the input that are of equal decimal order to the input. For example, let it be assumed that during a first microsecond the units decimal portion of a quantity is impressed on input terminals 1A' and during a second microsecond the tens decimal portion of said same quantity is impressed on the input terminals 1A' of the product generator. Then during the fifth microsecond the units decimal portion of the one multiple of said quantity will appear at output terminals 1A, the units decimal portion of the two multiple of said quantity will appear at output terminals 2A and correspondingly as to the three through nine multiples the units decimal portion of each will appear at the respective terminal groups 3A through 9A. Now during the sixth microsecond, the tens decimal portion of the one through nine multiples of said quantity will respectively appear at output terminal groups 1A through 9A. In like manner the hundreds portion of the multiples will appear at the output terminals during the seventh microsecond.

Actually, it is to be kept in mind that the delay circuit of Fig. 3, the doubler circuit of Fig. 2, the binary decimal adder circuit of Fig. 4, and the quintupler circuit of Fig. 5 each have an inherent delay of one microsecond and thus when an input to the product generator is serially subjected to any three of these units, the output order of the product generator corresponding to the input order of the product generator will be delayed three microseconds. The inherent delay of one microsecond in the afore-recited circuits may be eliminated by omitting the appropriate delay circuits.

Now it will be seen that the one multiple is obtained by subjecting the input of the product generator to a three microsecond delay.

The two multiple is obtained by employing a doubler circuit and subjecting the output of the doubler circuit to a two microsecond delay.

The three multiple is obtained by adding the one multiple and the two multiple and subjecting the sum to the proper delay.

The four multiple is obtained by the serial employment of a first doubler circuit, a second doubler circuit and subjecting the output of the second doubler circuit to a one microsecond delay.

The five multiple is obtained by employing the quintupler circuit and introducing the proper delay.

The six multiple is obtained by doubling the three multiple.

The seven multiple is obtained by adding the three and four multiples.

The eight multiple is obtained by doubling the four multiple.

The nine multiple is obtained by adding the four and five multiples.

It will be apparent to those skilled in the art that the novel binary-decimal doubler circuit herein disclosed and the novel quintupler circuit herein disclosed can be combined in a number of manners to obtain the multiples one through nine or any selected multiples. The multiples obtained by combining the novel binary-decimal doubler circuit and the novel binary-decimal quintupler circuit may be obtained simultaneously as in the disclosed embodiment of Fig. 1, or at various staggered times.

It will be appreciated that terms "doubler circuit" and "quintupler circuit" means excludes a mere adder or a mere combination of adders.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A binary-decimal product generator capable of accepting an electrical manifestation representative of an input decimal quantity expressed in binary-decimal notation, parallel by bit, serial by decimal order, and rendering as outputs, nine discrete electrical manifestations, which respectively represent in binary-decimal notation, parallel by bit, serial by decimal order, the one through nine multiples of said input decimal quantity, said product generator including: a group of input terminals; first delay circuit means connected between said group of input terminals and a first group of output terminals for providing an electrical manifestation representative of the one multiple of said input decimal quantity, expressed in binary-decimal notation, parallel by bit, serial by digit order; first binary-decimal doubler circuit means connected between said input terminals and a second group of output terminals for providing an electrical manifestation representative of the two multiple of said input decimal quantity, and expressed in binary-decimal notation, parallel by bit, serial by digit order; first binary-decimal adder circuit means coupled to said first delay circuit means, said first binary-decimal doubler circuit means and a third group of output terminals for combining the electrical manifestation representative of the one multiple with the electrical manifestation representative of the two multiple and providing an electrical manifestation representative of the three multiple of said input decimal quantity, expressed in binary-decimal notation, parallel by bit, serial by digit order; second binary-decimal doubler circuit means coupled to said first binary-decimal doubler circuit means and a fourth group of output terminals for accepting the electrical manifestation representative of the two multiple and providing an electrical manifestation representative of the four multiple of said input decimal quantity, expressed in binary-decimal notation, parallel by bit, serial by digit order; binary-decimal quintupler circuit means coupled to said first delay circuit means and a fifth group of output terminals for accepting the electrical manifestation representative of the one multiple and providing an electrical manifestation representative of the five multiple of said input decimal quantity, expressed in binary-decimal notation, parallel by bit, serial by digit order; third binary-decimal doubler circuit means coupled to said first binary-decimal adder means and a sixth group of output terminals for accepting the electrical manifestation representative of the three multiple and providing an electrical manifestation representative of the six multiple of said input decimal quantity, expressed in binary-decimal notation, parallel by bit, serial by digit order; second binary-decimal adder means coupled to said first binary-decimal adder means, said second binary-decimal doubler circuit means and a seventh group of output terminals for combining the electrical manifestation representative of the three multiple with the electrical manifestation representative of the four multiple and providing an electrical manifestation representative of the seven multiple of said input decimal quantity, expressed in binary-decimal notation, parallel by bit, serial by digit order; fourth binary-decimal doubler circuit means coupled to said second binary-decimal doubler circuit means and an eighth group of output terminals for accepting the electrical manifestation representative of the four multiple and providing an electrical manifestation representative of the eight multiple of said input decimal quantity, expressed in binary-decimal notation, parallel by bit, serial by digit order; and third binary-decimal adder means coupled to said second binary-decimal doubler circuit means, said binary-decimal quintupler circuit means and a ninth group of output terminals for combining the electrical manifestation representative of the four multiple with the electrical manifestation representative of the five multiple and providing an electrical manifestation representative of the nine multiple of said input decimal quantity, expressed in binary-decimal notation, parallel by bit, serial by digit order.

2. A binary-decimal doubler circuit capable of accepting an electrical manifestation representative of an input decimal quantity expressed in binary-decimal notation parallel by bit, serial by digit order and rendering as an output an electrical manifestation representative of double said input decimal quantity and expressed in binary-decimal notation parallel by bit, serial by digit order, said binary-decimal doubler circuit including: a group of input terminals consisting of a 1 bit terminal, a 2 bit terminal, a 4 bit terminal, and an 8 bit terminal; rationalizer circuit means for accepting the electrical manifestation representative of said input decimal quantity expressed in binary-decimal notation, parallel by bit, serial by digit order and rendering as an output an electrical manifestation representative of double said input decimal quantity and expressed in a code consisting of 2, 4, 8 and 10 bit portions; said rationalizer circuit means having a group of input terminals consisting of a 2 bit terminal, a 4 bit terminal, an 8 bit terminal and a 16 bit terminal; means respectively coupling the 1, 2, 4 and 8 bit input terminals of the doubler circuit to the 2, 4, 8 and 16 bit input terminals of said rationalizer circuit means; said rationalizer circuit means including a first group of output terminals consisting of a 2 bit terminal, a 4 bit terminal, an 8 bit terminal and a 10 bit terminal; and additional circuit means coupled to said first group of output terminals of said rationalizer circuit means for converting the electrical manifestation representative of double said input decimal quantity, and expressed in said code consisting of 2, 4, 8 and 10 bit portions, into the electrical manifestation representative of double said input quantity and expressed in binary-decimal notation, parallel by bit, serial by digit order, said additional circuit means including a group of binary-decimal doubler circuit output terminals consisting of a 1 bit terminal, a 2 bit terminal, a 4 bit terminal, and an 8 bit terminal, a first delay circuit coupled between the 2 bit output terminal of the rationalizer circuit means and the 2 bit output terminal of the binary-decimal doubler circuit, a second delay circuit coupled between the 4 bit output terminal of the rationalizer circuit means and the 4 bit output terminal of the binary-decimal doubler circuit, a third delay circuit coupled between the 8 bit output terminal of the rationalizer circuit means and the 8 bit output terminal of the binary-decimal doubler circuit, and a fourth delay circuit connected between the 10 bit output terminal of the rationalizer circuit means and the 1 bit output terminal of the binary-decimal doubler circuit.

3. A binary-decimal doubler circuit as claimed in claim 2 further characterized in that said first, second and third delay circuits, respectively, introduce a time delay of $t$ microseconds, whereas said fourth delay circuit introduces a time delay of $2t$ microseconds and wherein $t$ is a positive number of the order of magnitude of decimal value one.

4. A binary-decimal doubler circuit capable of accepting an electrical manifestation representative of an input decimal quantity expressed in binary-decimal notation parallel by bit, serial by digit order and rendering an electrical manifestation representative of an output decimal quantity and expressed in binary-decimal notation parallel by bit, serial by digit order, said binary-decimal doubler circuit including: a group of input terminals consisting of a 1 bit terminal, a 2 bit terminal, a 4 bit terminal and an 8 bit terminal; a group of output terminals consisting of a 1 bit terminal, a 2 bit terminal, a 4 bit terminal and an 8 bit terminal; rationalizer circuit means for converting a electrical manifestation representative of said input decimal quantity, expressed in binary-decimal notation, parallel by bit, serial by digit order, into an electrical manifestation representative of double said input decimal quantity, expressed in a code consisting of 2, 4, 8 and 10 bit portions; said rationalizer circuit means including a group of input terminals consisting of a 2 bit terminal, a 4 bit terminal, an 8 bit terminal and a 16 bit terminal and a group of output terminals consisting of a 2 bit terminal, a 4 bit terminal, an 8 bit terminal and a 10 bit terminal; circuit means respectively connecting the 1, 2, 4 and 8 bit input terminals of said binary-decimal doubler circuit to the 2, 4, 8 and 16 bit input terminals of said rationalizer circuit means; additional circuit means respectively connecting the 2, 4 and 8 bit output terminals of said rationalizer circuit means to the 2, 4 and 8 bit output terminals of said binary-decimal doubler circuit; and delay circuit means connected between the 10 bit output terminal of said rationalizer circuit means and the 1 bit output terminal of said binary-decimal doubler circuit, whereby said electrical manifestation representative of said output decimal quantity, of double said input decimal quantity, and expressed in binary-decimal notation, parallel by bit, serial by digit order will be electrically manifested at said group of output terminals of said binary-decimal doubler circuit.

5. A binary-decimal quintupler circuit capable of accepting an electrical manifestation representative of an input decimal quantity expressed in binary-decimal notation, parallel by bit, serial by digit order and rendering as an output an electrical manifestation representative of the five multiple of said input decimal quantity and expressed in binary-decimal notation parallel by bit, serial by digit order, said binary-decimal quintupler circuit including: first circuit means including time delay circuit means for converting said electrical manifestation representative of said input decimal quantity, expressed in binary-decimal notation, parallel by bit, serial by digit order, to an electrical manifestation representative of a decimal quantity equal to the five multiple of said input decimal quantity and expressed in a code consisting of two discrete 1 bit portions, a 2 bit portion and two discrete 4 bit portions; and binary adder means responsively coupled to said first circuit means for converting said electrical manifestation representative of the five multiple of said input decimal quantity and expressed in said code consisting of two discrete 1 bit portions, a 2 bit portion, and two discrete 4 bit portions into said electrical manifestation representative of the five multiple of said input decimal quantity and expressed in binary-decimal notation, parallel by bit, serial by digit order.

6. A binary-decimal quintupler circuit capable of accepting an electrical manifestation representative of an input decimal quantity, expressed in binary-decimal notation, and rendering as an output an electrical manifestation representative of the five multiple of said input decimal quantity and expressed in binary-decimal notation, said binary-decimal quintupler circuit including: a group of quintupler circuit input terminals consisting of a 1 bit terminal, a 2 bit terminal, a 4 bit terminal and an 8 bit terminal; a group of binary adders consisting of a 1 bit adder, a 2 bit adder and a 4 bit adder, each of said adders having a plurality of input terminals, a sum output terminal and a carry output terminal; means connecting said 1 bit input terminal of the quintupler circuit to a first input terminal of said 1 bit adder and a first input terminal of said 4 bit adder; delay circuit means respectively coupling said 2, 4 and 8 bit input terminals of said quintupler circuit to, a second input terminal of said 1 bit adder, a first input terminal of said 2 bit adder, and a second input terminal of said 4 bit adder; connection means respectively connecting said carry output terminal of said 1 bit binary adder to a second input terminal of said 2 bit binary adder and said carry output terminal of said 2 bit binary adder to a third input terminal of said 4 bit binary adder; a group of quintupler circuit output terminals consisting of a 1 bit terminal, a 2 bit terminal, a 4 bit terminal and an 8 bit terminal; and coupling means respectively coupling said sum output of said 1 bit binary adder to said 1 bit output terminal of said quintupler circuit, said sum output terminal of said 2 bit binary adder to said 2 bit output terminal of said quintupler circuit, said sum output terminal of said 4 bit binary adder to said 4 bit output terminal of said quintupler circuit, and said carry output terminal of said 4 bit binary adder to said 8 bit output terminal of said quintupler circuit, whereby said electrical manifestation representative of the five multiple of said input decimal quantity appears at said quintupler circuit output terminals and is expressed in binary-decimal notation.

7. A binary-decimal quintupler circuit capable of accepting an input expressed in binary-decimal notation and rendering the five multiple of said input in binary-decimal notation including: a group of quintupler circuit input terminals consisting of a 1 bit terminal, a 2 bit terminal, a 4 bit terminal and an 8 bit terminal; a group of binary adders consisting of a 1 bit adder, a 2 bit adder and a 4 bit adder, each of said adders having a plurality of input terminals, a sum output terminal and a carry output terminals; means connecting said 1 bit input terminal of the quintupler circuit to a first input terminal of said 1 bit adder and a first input terminal of said 4 bit adder; delay circuit means respectively coupling said 2, 4 and 8 bit input terminals of the quintupler circuit to, a second input terminal of said 1 bit adder, a first input terminal of said 2 bit adder and a second input terminal of said 4 bit adder; means respectively coupling the carry output terminal of said 1 bit adder to a second input terminal of said 2 bit adder and the carry output terminal; means connecting said 1 bit input terminal of said 4 bit adder; a group of quintupler circuit output terminals consisting of a 1 bit terminal, a 2 bit terminal, a 4 bit terminal and an 8 bit terminal; means respectively connecting the sum output terminals of said 1 bit adder, said 2 bit adder and said 4 bit adder to the 1 bit output terminal, the 2 bit output terminal and the 4 bit output terminal of the quintupler circuit; and means coupling said carry output terminal of said 4 bit binary adder to said 8 bit output terminal of the quintupler circuit.

8. A binary-decimal quintupler circuit as claimed in claim 7 further characterized in that the means respectively coupling the sum output terminals of the 1 bit binary adder, the 2 bit binary adder and the 4 bit binary adder to the 1 bit, 2 bit and 4 bit output terminals of the quintupler circuit includes delay circuit means and that the means coupling the carry output terminal of the 4 bit binary adder to the 8 bit output terminal of the quintupler circuit includes delay circuit means.

References Cited in the file of this patent

UNITED STATES PATENTS

| | | |
|---|---|---|
| 2,394,924 | Luhn | Feb. 12, 1946 |
| 2,429,228 | Herbst | Oct. 21, 1947 |
| 2,571,680 | Carbrey | Oct. 16, 1951 |
| 2,604,262 | Phelps | July 22, 1952 |
| 2,700,502 | Hamilton | Jan. 25, 1955 |
| 2,700,503 | Crosman | Jan. 25, 1955 |
| 2,722,375 | Chenus | Nov. 1, 1955 |
| 2,745,599 | Woods-Hill et al. | May 15, 1956 |
| 2,823,855 | Nelson | Feb. 18, 1958 |
| 2,850,233 | Blankenbaker | Sept. 2, 1958 |
| 2,856,126 | Kilburn | Oct. 14, 1958 |

OTHER REFERENCES

Theory and Design of Electronic Digital Computers, Lecture 47, June 1948, Moore School of Electrical Engineering, 12 pages 47–1 to 47–12 and 4 shts. dwg.

Harvard University Computation Lab., Synthesis of Electronic Computing and Control Circuits, vol. XXVII Harvard Univ. Press, copyright, 1951, pages 3 to 14, 184 to 186, 202, 203, 204, 205, 216 to 230.

UNITED STATES PATENT OFFICE

CERTIFICATE OF CORRECTION

Patent No. 2,934,269 April 26, 1960

Byron L. Havens et al.

It is hereby certified that error appears in the printed specification of the above numbered patent requiring correction and that the said Letters Patent should read as corrected below.

Column 2, line 62, for "doubler" read -- quin- --; column 22, line 56, for "terminals" read -- terminal --; line 66, strike out "; means connecting said 1 bit" and insert instead -- of said 2 bit adder to a third --.

Signed and sealed this 11th day of October 1960.

(SEAL)
Attest:

KARL H. AXLINE
Attesting Officer

ROBERT C. WATSON
Commissioner of Patents